United States Patent Office 3,849,433
Patented Nov. 19, 1974

3,849,433
4,5,6,7-TETRAHYDROBENZOTRIAZOLES AND PROCESS OF MAKING THE SAME
Ivan Butula, Zagreb, Yugoslavia, assignor to Rhein-Chemie Rheinau G.m.b.H., Mannheim, Germany
No Drawing. Filed Sept. 24, 1970, Ser. No. 75,255
Claims priority, application Germany, Sept. 26, 1969,
P 19 48 794.6
Int. Cl. C07d 55/04
U.S. Cl. 260—308 B            13 Claims

ABSTRACT OF THE DISCLOSURE 4,5,6,7-tetrahydrobenzotriazoles of the formulae

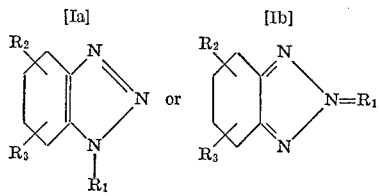

wherein $R_1$, $R_2$ and $R_3$ are hydrogen or organic radicals defined in the specification, with the proviso that if $R_2$ and $R_3$ are hydrogen, then $R_1$ must be other than hydrogen.

The compounds, including those where $R_1$, $R_2$ and $R_3$ are all hydrogen and those where $R_1$ is phenyl, are made by hydrogenating the compound in the form of their acid addition salts by adding a solvent in which the acid addition salt is at least partially soluble or, if the starting product is in the form of a free base, by adding at least one equivalent of acid for each basic group. The reaction in both cases is carried out in the presence of a palladium, rhodium or platinum catalyst. The obtained salt may then be converted to the free base by addition of alkali or the free base may be converted to the acid addition salt or quaternary ammonium salt by addition of an acid, preferably a strong acid, or ammoniating agent.

The compounds of the invention are principally useful as corrosion inhibitors. They also are antioxidants and intermediates for making various pharmaceutical and agricultural chemicals.

BACKGROUND OF THE INVENTION

Few 4,5,6,7-tetrahydrobenzotriazoles have become known heretofore, and little use has been made of the compounds. These tetrahydrobenzotriazole derivatives have been made by total synthesis; see K. Adler and W. Steni, Liebigs Annalen der Chemie, 501, p. 47 (1933); G. Wittig and W. Krebs, Chem. Ber. 94, p. 3274 (1961); R. Fusco et al., Gazz. Chim. Ital. 91, pp. 849 and 933 (1961) since most benzotriazole derivatives are highly resistant against reducing agents. For instance, 1-hydroxymethyl-benzotriazole could not be hydrogenated with LiAlH$_4$ or Raney-Nickel or a Pd-carbon catalyst; see Gaylord, J. Am. Chem. Soc. 76, p. 285 (1954). Likewise, 1-phenyl-benzotriazole could not be hydrogenated with either LiAlH$_4$ or with Raney-Nickel as catalyst. In using zinc amalgam as reducing agent, the reaction resulted in an opening up of the triazole ring in the benzotriazole and formation of 2-amino-diphenylamine; see Masao Wakae et al., Osaka Turitsu Kogyo Shoreikan Hokoku No. 27, pp. 46–47 (1962)—C.A. 61, 3096b (1964).

Similar reductive opening up of the triazole ring of benzotriazole upon formation of phenyldiamine derivatives has been described in other publications; see Stetter, Chem. Ber. 86, p. 69 (1953) and Burton et al., J. Chem. Soc. (London), Sect. C, 1968, pp. 1268–1273.

It is therefore an object of the invention to provide for a process whereby benzotriazole and substituted benzotriazoles can be hydrogenated smoothly and at a desirable speed and with good yields.

Another object of the invention is to enlarge the group of obtainable substituted tetrahydrobenzotriazoles and to provide novel, heretofore unknown substituents of 4,5,6,7-tetrahydrobenzotriazoles.

A still further object of the invention is to provide acid addition salts and quaternary ammonium salts of the tetrahydrobenzotriazoles.

A more specific object of the invention is to form new substituted tetrahydrobenzotriazoles which are useful as corrosion inhibitors, acid passivating agents, metal restrainers, anti-aging agents for use in mineral oils, lubricating oils, heating oils and rubber. Further objects are substituted benzotriazoles which are useful as intermediates for making various pharmaceuticals, dyes such as azo-dyes, agricultural chemicals, dyeing additives, polymerization catalysts for isocyanate addition reactions, and as curing agents for epoxy resins. In so far as the quaternary ammonium salt of the tetrahydrobenzotriazoles are concerned, the object is to form ammonium salts which may be useful as surface-active agents.

SUMMARY OF THE INVENTION

The compounds of the invention are 4,5,6,7-tetrahydrobenzotriazoles of the formulae

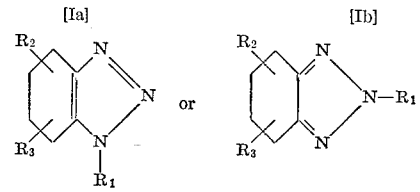

wherein $R_1$ is hydrogen, straight or branched alkyl of 1–18 carbon atoms, cycloalkyl, alkylcycloalkyl- or cycloalkylalkyl of 1–18 carbon atoms in the alkyl group and 5–6 members in the ring, a hexose, pentose or tetrose sugar residues or wherein $R_1$ is A–Z, A being a straight or branched alkyl of 1–4 carbon atoms and Z being amino, lower monoalkylamino, lower dialkylamino, morpholino, N-pyrrolidine, N-piperidino, N-piperazino, N'-lower alkyl-N-piperazino, N'-(ω-hydroxy-lower alkyl)-N-piperazino, N'-(ω-hydroxyalkoxy-lower alkyl)-N-piperazino, hydroxyalkyl, carboxyalkyl, dialkylamino-ethylaminocarbonylalkyl, dialkylaminoethoxycarbonylalkyl, the last four groups having 1–4 carbon atoms in alkyl, carboxycyclohexyl, phenyl, alkylphenyl, alkoxyphenyl, the last two groups having 1 or 2 carbon atoms in alkyl and alkoxy, respectively, fluorine, trifluoromethyl, carboxyphenyl, phenylalkyl of 1–4 carbon atoms in alkyl, fluorophenylalkyl, carboxyphenylalkyl, acylaminophenylalkyl, the last three groups having a 1–8 carbon atoms in acyl, imidazolylalkyl, triazolylalkyl or tetrazolylalkyl, the azolyl groups, having 1–4 carbon atoms in alkyl;
$R_2$ being hydrogen, a straight or branched alkyl of 1–18 carbon atoms, cyclohexyl, phenyl, carboxyl, or alkoxycarbonyl of 1–4 carbon atoms in the alkoxy group and wherein
$R_3$ is hydrogen or branched or straight alkyl of 1–4 carbon atoms,
with the provisio that if both $R_2$ and $R_3$ are hydrogen, then $R_1$ must be other than hydrogen, and the acid addition salts and quaternary ammonium salts of the said tetrahydrobenzotriazoles.

The compounds of the invention and including those where all of $R_1$, $R_2$ and $R_3$ are hydrogen and those wherein $R_1$ is phenyl are made by hydrogenating the compound in the form of their acid addition salts by adding a solvent in which the acid addition salt is at least partially soluble or, if the starting product is in the form of a free base, by adding at least one equivalent of acid for each basic group. The reaction in both cases is carried out in the presence of a palladium, rhodium or platinum catalyst. The obtained salt may then be converted to the free base by addition of alkali or the free base may be converted to the acid addition salt of quaternary ammonium salt by addition of an acid, preferably a strong acid, or ammoniating agent.

The invention also embraces the use of the tetrahydrobenzotriazoles and derivatives thereof as corrosion inhibitors and the process of making 4,5,6,7 tetrahyde benzotriazoles by hydrogenation of benzotriazoles.

DETAILED DESCRIPTION OF THE INVENTION AND OF THE PREFERRED EMBODIMENTS

The terms in this specification and in the claims such as "lower alkyl," "lower alkylene," "lower alkylamino-, dialkylamino or alkylenediamino" are intended to include groups having from 1 to 8 carbon atoms.

The salts of 4,5,6,7-tetrahydrobenzotriazoles referred to herein may be salts of inorganic or organic acids and include also the quaternary ammonium salt. Examples for suitable inorganic acids for forming these salts are the hydrogen halide acids, sulfuric acid, phosphoric acid, nitric acid and perchloric acid. Examples of suitable organic acids are acetic acid, propionic acid, oxalic acid, maleic acid, succinic acid, alkyl- and alkenyl-succinic acids, aliphatic, cycloalphatic and aromatic sulfone acids, such as petroleum sulfonic acids, mahogany sulfonic acids, p-toluenesulfonic acids and p-dodecylbenzenesulfonic acid and picric acid.

The quaternary ammonium salts of the invention are derived from the usual alkylation agents such as alkyl-, cycloalkyl- or arylalkyl halides, for instance methyl bromide and ethyl iodide or dialkylsulfates.

The novel compounds of the invention and also the few heretofore known compounds such as the unsubstituted 4,5,6,7-tetrahydrobenzotriazoles and the known substituted 4,5,6,7 - tetrahydrobenzotriazoles such as 1-phenyl- and 1-phenyl-5-methyl-4,5,6,7-tetrahydrobenzotriazole, are made by hydrogenating a benzotriazole of the formulae

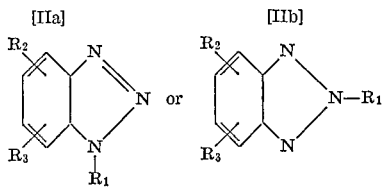

[IIa]    [IIb]

wherein $R_1$, $R_2$ and $R_3$ have the meaning as above given and all of the three groups may also be hydrogen, and $R_1$ may also be phenyl, in the presence of a palladium, platinum or rhodium catalyst. The reaction is carired out using an acid addition salt of the above-given benzotriazoles as starting product or, if the reaction starts from the free base, it is carried out in the presence of at least one equivalent of acid for each basic group.

The process of the invention is generally characterized by the following stages:

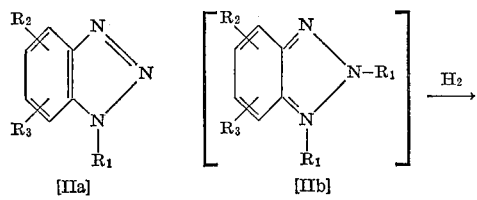

[IIa]    [IIb]

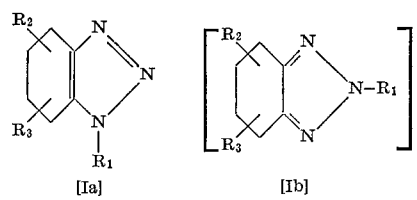

[Ia]    [Ib]

If the groups identified as $R_1$, $R_2$ and $R_3$ are themselves hydrogenizable groups, or have attached thereto such groups, they may be subject also to hydrogenation under specific conditions.

The novel process basically involves a hydrogenation of the benzene nucleus of benzotriazole without any effect on the substitution groups. If there are present other aromatic groups, they can not be easily affected at normal pressures. However, at higher temperatures and pressures, the 4,5,6,7 - tetrahydrobenzotriazole derivatives can be formed after completion of the hydrogenation as can be determined by figuring the amount of adsorbed hydrogen. If the hydrogenation is then continued, and particularly where rhodium or platinum are used as catalyst, it is then possible also to hydrogenate the other aromatic groups.

To illustrate this, if 1-phenylbenzotriazole is hydrogenated at 80° C. and at a pressure of 1 kg./cm.², only 1 - phenyl - 4,5,6,7 - tetrahydrobenzotriazole is obtained. If the hydrogenation is then continued at 120° C. and a hydrogen pressure of 50 kg./cm.² there is obtained 2-cyclohexyl-4,5,6,7-tetrahydrobenzotriazole.

If pyridyl-substituted benzotriazoles are subjected to the hydrogenation of the invention, it is the pyridine nucleus which is first saturated, followed by saturation of the benzene nucleus.

The catalysts used in the invention are the conventional palladium, platinum or rhodium catalysts which may be used as such or on different carrier materials. It is preferred to use the catalysts on carriers. Suitable carrier materials are, for instance, silicic acid, diatomaceous earths, aluminum oxide, pumice, asbestos, carbon, titanium dioxide, barium sulfate, vermiculite and silica gel. The platinum metals are usually employed in the carrier catalyst in amounts between 2 and 10%. The catalysts can be reused after thorough washing with, for instance, water, methanol or glacial acetic acid.

The process of the invention is carried out in a solvent or diluent in which the employed benzotriazole is at least partially soluble. Examples of such solvents are water, acetic acid, propionic acid, lower aliphatic alcohols, glycol ether, diethyl ether, tetrahydrofuran or mixtures of these compounds.

In a few cases it is possible to effect the hydrogenation of the benzotriazoles without the addition of a strong acid. Preferred, however, is the embodiment where a strong acid is used or, alternatively, where an acid addition salt is used as the starting product.

The invention can be practiced in a comparatively broad temperature range at normal pressure or superatmospheric pressure. The preferred temperature range at normal pressure is about 0° C. up to the boiling point of the solvent or diluent. Under these conditions it is preferred to use palladium as catalyst.

If a superatmospheric pressure is employed, the preferred catalysts are palladium and rhodium. If it is desired to apply the hydrogenation also to aromatic substituents, the process is effected preferably with rhodium, palladium or platinum catalysts. The hydrogenation can be carried out at a pressure between normal pressure and up to about 120 kg./cm.² or more. The hydrogenation can also be effected at both highly elevated pressures and temperatures; this is possible in view of the starting product or desired end product.

The following Tables I–IV illustrate the results of the hydrogenation of benzotriazoles under varying conditions.

TABLE I

The hydrogenation in this case was effected of 10 mmol benzotriazole in 30 ml. solvent at 1 atm. or at 60 atm. above atmospheric pressure employing 20 mmol benzotriazole in 50 ml. solvent and using different catalysts on a carbon carrier, the catalysts being present in an amount of 5%.

| Test number | Benzotriazole, grams | Catalyst metal | Solvent | Temp., °C. | Pressure above atmospheric (atm.) | Time of hydrogenation (hours) Half time | Completion time |
|---|---|---|---|---|---|---|---|
| 1 | 1.2 | Pd (0.1) | Ethanol | 60 | 1 | 5.2 | (1) |
| 2 | 1.2 | Pt (0.1) | do | 60 | 1 | 11.0 | (2) |
| 3 | 1.2 | Rh (0.1) | do | 60 | 1 | No hydrogenation. | |
| 4 | 1.2 | Pd (0.1) | AcOH | 60 | 1 | 1.6 | 3.8 |
| 5 | 1.2 | Pt (0.1) | AcOH | 60 | 1 | 4.0 | (3) |
| 6 | 1.2 | Rh (0.1) | AcOH | 60 | 1 | No hydrogenation. | |
| 7 | 1.2 | Pd (0.1) | AcOH plus 1.1 g. $HClO_4$ | 60 | 1 | 0.25 | 0.6 |
| 8 | 1.2 | Pt (0.1) | do | 60 | 1 | 1.0 | 2.2 |
| 9 | 1.2 | Rh (0.1) | do | 60 | 1 | 4.0 | 9.5 |
| 10 | 2.4 | Pd (0.025) | $H_2O$ plus 1.0 g. $H_2SO_4$ | 120 | 60 | 0.3 | 0.7 |
| 11 | 2.4 | Pt (0.025) | do | 120 | 60 | 0.25 | 0.5 |
| 12 | 2.4 | Rh (0.025) | do | 120 | 60 | 0.25 | 0.5 |

[1] Further very slow hydrogenation necessary.
[2] Not complete after 30 hours.
[3] No definite result.

TABLE II

In this case the hydrogenation was effected with 10 mmol of 5-carboxy-benzotriazole in 30 ml. solvent at a pressure of 1 atm. above atmospheric.

In another series the reaction was effected with 20 mmol of 5-carboxy-benzotriazole in 50 ml. solvent at a pressure of 60 atm. above atmospheric.

Various catalysts were used in an amount of 5% of the total catalyst-carrier material, and the carrier was a carbon material.

| Test number | 5-carboxytriazole, grams | Catalyst metal | Solvent | Temp., °C. | Pressure above atmospheric (atm.) | Time of hydrogenation (hours) Half time | Completion time |
|---|---|---|---|---|---|---|---|
| 1 | 1.6 | Pd (0.1) | AcOH | 60 | 1 | 2.5 | 6.0 |
| 2 | 1.6 | Pt (0.1) | AcOH | 60 | 1 | Slow hydrogenation. | |
| 3 | 1.6 | Rh (1.0) | AcOH | 60 | 1 | Slow hydrogenation. | |
| 4 | 1.6 | Pd (0.1) | AcOH plus 1.1 g. $HClO_4$ | 60 | 1 | 1.1 | 2.5 |
| 5 | 1.6 | Pt (0.1) | do | 60 | 1 | 5.0 | (1) |
| 6 | 1.6 | Rh (0.1) | do | 60 | 1 | 4.5 | (1) |
| 7 | 2.4 | Pd (0.025) | do | 120 | 60 | 0.3 | 0.7 |
| 8 | 2.4 | Pt (0.025) | do | 120 | 60 | 0.8 | 1.7 |
| 9 | 2.4 | Rh (0.025) | do | 120 | 60 | 0.3 | 0.6 |

[1] No definite results.

A rapid hydrogenation was obtained when Tests 1–3 were repeated at a pressure of 60 atm. above atmospheric pressure and a temperature of 120° C.

TABLE III

The hydrogenation in this case was effected with 20 mmol (2.9 grams) 5,7-dimethyl-benzotriazole and a catalyst consisting of 1.5 g. Pd/$BaSO_4$ in 30 ml. solvent at 120° C. and a pressure of 60 atm. above atmospheric pressure.

| Test number | Solvent | Hydrogenation time (hours) Half time | Completion |
|---|---|---|---|
| 1 | Glacial acetic acid | 5 | 11 |
| 2 | Glacial acetic acid plus $H_2SO_4$ | 0.8 | 1.7 |

The hydrogenation of benzotriazoles which are not N-substituted, such as benzotriazole itself (Table I), and of benzotriazoles which are substituted in the benzene nucleus of the benzotriazole, such as 5-carboxybenzotriazole (Table III), 5-methyl- and 5,7-dimethylbenzotriazole (Table III) is rather difficult. The hydrogenation in neutral solvent and at times even in glacial acetic acid proceeded only very slowly and remained very often incomplete. However, when the starting product is used in the form of a salt with a strong acid, the hydrogenation proceeds at a rapid speed and comes to completion (Table I, Test 7; Table II, Tests 4–9; and Table III, Test 2). This illustrates that the conditions normally used for difficult hydrogenations (platinum and glacial acetic acid) are not sufficient here to successfully carry out the hydrogenation (see Table II, Test 2). Only after addition of a strong acid is it possible to effect hydrogenation with good yields (see Table II, Tests 5 and 8).

The activity of the platinum metals decreases upon hydrogenation at normal pressure and room temperature in the direction Pd>Pt>Rh, while it decreases at higher pressures and higher temperatures in the direction Rh>Pd>Pt.

Much easier is the hydrogenation of benzotriazoles which are substituted in the N-position, and particularly those substituted in the 2-N-position. In this case hydrogenation is sometimes possible in neutral solvents such as ethanol, dioxane or tetrahydrofuran. However, a substantial increase of the hydrogenation speed is obtained if strong acids are added (Table IV).

TABLE IV

In this case 10 mmole of 2-ethyl-benzotriazole was hydrogenated in 30 ml. solvent using 1 gram of a 5% Pd/$TiO_2$ catalyst and a temperature of 60° C. and a pressure of 1 atm. above atmospheric.

| Test number | Solvent | Hydrogenation time (hours) Half time | Completion |
|---|---|---|---|
| 1 | Ethanol | 4.0 | 9.0 |
| 2 | Glacial acetic acid | 1.5 | 3.2 |
| 3 | Glacial acetic acid plus 1.1 g. $HClO_4$ | 0.15 | 0.35 |

It is accordingly of great significance for the invention to select the proper solvents. In addition to acetic acid and other lower carboxylic acids, it is possible to use water and other polar solvents such as lower aliphatic alcohols, glycol ether, diethylether or tetrahydrofuran, provided that the starting product is used in the form of its salt with an inorganic or organic acid or, alternatively, that in addition to the solvent an acid is added in an amount of at least 1 equivalent for each basic group. If there is a deficiency in acid, either no hydrogenation takes place or the hydrogenation proceeds at a very slow speed and in some cases does not go to completion.

The Tables I–IV illustrate that the hydrogenation speed depends on the type of catalyst and salt and, in addition, on the temperature and the pressure.

The preferred and most economical conditions for the process of the invention are accordingly the following:

The hydrogenation preferably is carried out with Pd-, Pt- or Rh-carrier-catalysts in glacial acetic acid, diluted acetic acid, or water, upon addition of at least equimolar amounts of strong acids such as HCl, $H_2SO_4$, $HClO_4$, etc. Thus, all basic nitrogen groups which are present are neutralized with acid and possibly acid may be present in an excess. The temperature for the reaction preferably is between 20 and 120° C. and the pressure between 1 and 80 kg./cm.$^2$. Particularly economical is the hydrogenation in water with rhodium or palladium catalysts upon addition of strong acids and at elevated temperatures and pressures.

The process of the invention results in the formation of the salts of the tetrahydrobenzotriazoles. In order to obtain the free acids, the steps are employed which are discussed below as Methods A to D. The Methods A to C are useful for obtaining tetrahydrobenzotriazoles which do not form salts with a base. The tetrahydrobenzotriazoles which form salts with a base are preferably processed according to the Method D.

All parts stated below relate to weight-parts unless otherwise stated.

SURVEY OF HYDROGENATION METHODS

Method A 1 part of the starting product is hydrogenated with 0.01 to 1 part of a 5% Pd-, Pt- or Rh-carrier-catalyst in 10–20 parts of solvent at normal pressure in a flask provided with a magnetic stirrer. If a higher pressure is used, the process is carried out in an autoclave. The reaction temperatures and pressures are summarized in Table V below. After the calculated amount of hydrogen has been absorbed, the catalyst is removed by filtration and the filtrate is subjected to concentration. The residue is then dissolved in water, made alkaline with sodium hydroxide, and the hydrogenation is obtained by filtration and, if necessary, by extraction with a solvent. The crude product is then subjected to recrystallization from a suitable solvent.

Method B

The hydrogenation is carried out as in Method A. The catalyst is removed by filtration, and the filtrate is subjected to concentration. The residue is dissolved in water and the solution is made alkaline. The hydrogenation product is then extracted with chloroform, trichloroethylene, benzene or other water-immiscible solvents. The extract is dried on a drying agent, the solvent is distilled off and the liquid product is distilled in a high vacuum or converted to the hydrochloride.

Method C

The hydrogenation is carried out as in Method A. After removal of the catalyst by filtration and concentration of the solvent, dilution is effected of the residue with water, whereupon the mass is reacted with alkali in an amount equivalent to the amount of acid which was present during the hydrogenation. The hydrogenation product is precipitated after cooling and then subjected to filtration.

Method D

After removal of the catalyst by filtration the filtrate is concentrated, the amount equivalent to the inorganic acid is added in alkali, and the solution is evaporated to dryness. The residue is extracted with methanol or acetone, the extract is concentrated, and if the hydrogenation product does not crystallize it is precipitated with ether or another suitable solvent.

Method E

This method is used in order to obtain the quaternary ammonium salts. The method is employed with tetrahydrobenzotriazoles of the above formulae Ia and Ib in which $R_1$ is other than hydrogen.

1 mole of the tetrahydro compound was dissolved in a small amount of methanol, and the solution was reacted with 1 mole of an alkyl, cycloalkyl or arylalkyl halide and permitted to react for an extended time at room temperature or for a shorter period of time while being brought to an elevated temperature. After distilling off the solvent, the quaternary ammonium salt was obtained in almost pure form.

Method F

This method is used for tetrahydrobenzotriazoles of the general formula Ia given above in which $R_1$ is hydrogen. The tetrahydrobenzotriazole in this case is initially converted to the correspondnig 1- or 2-substituted compound by reaction with an alkyl-, cycloalkyl- or aralkyl halide or -sulfate.

In frequent cases mixtures are obtained of 1- and 2-isomers. The mixtures should then be separated and may be converted to the corresponding quaternary ammonium salts according to the above Method E.

In some cases good yields are also obtained in the following manner. 1 mole of the tetrahydro compound is reacted according to Method E with 1 mole of an alkyl-cycloalkyl, or arylalkyl halide. Thereafter, 1.1 mole of sodium hydroxide is added and the reaction mixture is heated upon reflux. After further addition of 1 mole of alkyl, cycloalkyl- or arylalkyl halide, the mixture is then further boiled for 1 hour upon reflux whereupon the precipitated sodium salt is filtered off and the solvent is distilled off. There remains the quaternary ammonium salt.

EXAMPLE

The following is a complete example of one illustrative procedure.

2.4 g. of benzotriazole were dissolved in 50 ml. water and 1 g. of concentrated sulfuric acid. The mass was then subjected to hydrogenation in the presence of 0.5 g. of a palladium-barium sulfate catalyst at a temperature of 120° C. and 60 at. above atmospheric pressure. After concentration to about half its volume, the tetrahydrobenzotriazole was precipitated by adding ammonia. The precipitate was taken up in glacial acetic acid ester and recrystallized from benzene. There were obtanied 2.2 g. of tetrahydrobenzotriazole with a melting point of 75° C.

In reference to the above-described general Methods A to F, the following Table will furnish further examples for making various hydrogenated tetrahydrobenzotriazoles.

In the following Table V, the pressure is given in atmospheres above atmospheric pressure.

TABLE V

| Starting product (IIa, IIb) | | | Conditions | | | Final product (Ia, Ib) | | | |
|---|---|---|---|---|---|---|---|---|---|
| $R_1$ | $R_2$ | $R_3$ | Method | Catalyst | Solvent | Temp., °C./press. atm. | Compound | No. | Yield, percent | M.P., °C. |
| H | H | H | A | Pd/BaSO$_4$ | H$_2$O+H$_2$SO$_4$ | 120/60 | 4,5,6,7-tetrahydrobenzotriazole. | 1 | 86 | 75 |
| 1-ethyl | H | H | B | Pb/TiO$_2$ | AcOH | 80/1 | 1-ethyl-4,5,6,7-tetrahydrobenzotriazole. | 2 | 93 | Liquid |
| 2-ethyl | H | H | B | Pt/carbon | AcOH | 60/1 | 2-ethyl-4,5,6,7-tetrahydrobenzotriazole. | 3 | 92 | Liquid |

TABLE V—Continued

| Starting product (IIa, IIb) | | | Conditions | | | | Final product (Ia, Ib) | | | |
|---|---|---|---|---|---|---|---|---|---|---|
| $R_1$ | $R_2$ | $R_3$ | Method | Catalyst | Solvent | Temp., °C./press. atm. | Compound | No. | Yield, percent | M.P., °C. |
| 1-hexadecyl | H | H | A | Pd/carbon | $H_2O$+HCl | 60/60 | 1-hexadecyl-4,5,6,7-tetrahydrobenzotriazole. | 4 | 89 | 52 |
| 1-carboxyethyl. | H | H | C | Rh/carbon | AcOH | 120/60 | 1-carboxyethyl-4,5,6,7-tetrahydrobenzotriazole. | 5 | 90 | 156 |
| 1-methoxycarbonylethyl. | H | H | B | do | AcOH | 120/60 | 1-methoxycarbonylethyl-4,5,6,7-tetrahydrobenzotriazole. | 6 | 96 | Liquid |
| 1-carboxypropyl(2). | H | H | C | Pt/carbon | $H_2O$+$H_2SO_4$ | 60/1 | 1-carboxypropyl-(2)-4,5,6,7-tetrahydrobenzotriazole. | 7 | 88 | 178 |
| 1-phenyl | H | H | A | Pd/$TiO_2$ | AcOH+$H_2SO_4$ | 80/1 | 1-phenyl-4,5,6,7-tetrahydrobenzotriazole. | 8 | 94 | 119 |
| Do | H | H | A | Ph/carbon | AcOH+$HClO_4$ | 120/60 | 1-cyclohexyl-4,5,6,7-tetrahydrobenzotriazole. | 9 | 90 | 103 |
| 1-benzyl | H | H | A | do | AcOH | 120/60 | 1-cyclohexylmethyl-4,5,6,7-tetrahydrobenzotriazole. | 10 | 55 | 93 |
| 1-, 4-acetaminobenzyl. | H | H | | Pd/$BaSO_4$ | AcOH+$H_2SO_4$ | 120/60 | 1-, 4-acetaminobenzyl-4,5,6,7-tetrahydrobenzotriazole. | 11 | 62 | 195 |
| H | 5-methyl | H | A | Pd/$TiO_2$ | AcOH+$HClO_4$ | 120/60 | 5-methyl-4,5,6,7-tetrahydrobenzotriazole. | 12 | 82 | 57 |
| H | 5-carboxy | H | D | Pd/carbon | AcOH+$HClO_4$ | 120/60 | 5-carboxy-4,5,6,7-tetrahydrobenzotriazole. | 13 | 85 | 182 |
| H | 4-methyl | 6-methyl | A | Pt/$BaSO_4$ | $H_2O$+$H_2SO_4$ | 120/60 | 4,6-dimethyl-4,5,6,7-tetrahydrobenzotriazole. | 14 | 83 | 82 |
| 1-H | 5-methyl | do | B | Pt/$O_2$ | AcOH | 120/60 | 5,6-dimethyl-4,5,6,7-tetrahydrobenzotriazole. | 15 | 93 | Liquid |
| 1-hexadecyl | 5-methoxycarbonyl. | H | A | Pd/$TiO_2$ | AcOH | 60/1 | 1-hexadecyl-5-methoxycarbonyl-4,5,6,7-tetrahydrobenzotriazole. | 16 | 72 | 46 |

The tetrahydrobenzotriazoles were clearly identified from the infrared spectrum. The aromatic oscillations of the benzene nucleus, which are characteristic for unhydrogenated benzotriazoles (between 670 and 900 cm.$^{-1}$ depending on the type of substitution) are no longer noticeable in case of the hydrogenated compounds. The (HN) associated absorption between 2400 and 3500 cm.$^{-1}$, which is characteristic for the triazole nucleus, remains intact with the compounds which are unsubstituted in the N-position.

The tetrahydrobenzotriazoles made by the process of the invention can be used for different purposes, particularly as corrosion inhibitors, especially for copper and copper alloys. They can also be used for acid passivating agents for iron and steel, as inhibitors in metal restraining agents, as anti-aging agents in mineral oils, heat oils and rubber, and as intermediates for making pharmaceuticals and agricultural chemicals. The quaternary ammonium salts of the tetrahydrobenzotriazoles possess a strong surface-active effective and are suitable as wetting agents and softeners for textiles.

A few examples below will illustrate the use of 4,5,6,7-tetrahydrobenzotriazoles as metal-deactivators in lubricating oils. The tests were carried out according to ASTM Standard D 130. A copper strip was immersed in a corrosive sulfur-containing mineral oil at an elevated temperature while an amount of 0.025% of the test compound was added. The mineral oil was a primary raffinate SAE 10 with sulfurized sperm oil and was adjusted to a total sulfur amount of 0.5%.

The amount of discoloration of the copper strip was used as measure of the passivating action of the compound. The grading 1a to 4c was effected according to the color table as ASTM D 130. The designations 1a to 3b indicate increasing discoloration. The designations 4a to 4c indicate strong increase of corrosion.

| Test No. | Compound | Temperature 100° C. | | | Temperature 135° C. | | |
|---|---|---|---|---|---|---|---|
| | | 24 h. | 120 h. | 240 h. | 24 h. | 120 h. | 240 h. |
| 1 | | 3a | 4a | 4a | 3b | 4c | 4c |
| 2 | 2-mercaptobenzothiazole | 1a | 3a | 3a | 4a | 4c | 4c |
| 3 | 2,5-dialkylmercapto-1,3,4-thiadiazole.[1] | 1a | 1b | 3a | 3b | 4a | 4a |
| 4 | 4,5,6,7-tetrahydrobenzotriazole. | 1a | 1a | 1a | 3a | 3a | 3b |
| 5 | 5-methyltetrahydrobenzotriazole. | 1b | 3a | 3a | 3a | 3a | 3a |
| 6 | 4,6-dimethyl-4,5,6,7-tetrahydrobenzotriazole. | 1b | 3a | 3a | 3a | 3a | 3b |
| 7 | 1-phenyl-4,5,6,7-tetrahydrobenzotriazole. | 1b | 3a | 3a | 3a | 3a | 3b |

[1] Amoco 150 inhibitor.

As the Table shows, the hydrogenated benzotriazoles have a better effect, particularly at increased temperatures, than the benzothiazole and the thiodiazole derivatives used heretofore for these purposes (see Tests 2 and 3).

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A 4,5,6,7-tetrahydrobenzotriazole of the group consisting of compounds having the following formulae:

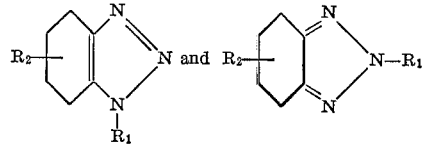

in which $R_1$ is hydrogen or an alkyl radical containing up to 18 carbon atoms, and $R_2$ is a carboxyl or lower alkoxycarbonyl radical, and acid addition and quaternary ammonium salts thereof.

2. A compound as defined in claim 1 which is 5-carboxy-4,5,6,7-tetrahydrobenzotriazole.

3. A compound as defined in claim 1 which is 1-hexadecyl-5-methoxycarbonyl-4,5,6,7-tetrahydrobenzotriazole.

4. The compound of claim 1 wherein alkyl in $R_2$ has from 1 to 4 carbon atoms.

5. A process for the production of a 4,5,6,7-tetrahydrobenzotriazole as defined in claim 1 which comprises passing a stream of hydrogen into a solution of a benzotriazole of the group consisting of compounds having the following formulae:

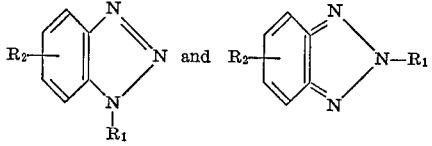

in which $R_1$ is hydrogen or an alkyl radical containing up to 18 carbon atoms and $R_2$ is a carboxylic or lower alkoxycarbonyl radical in a solvent therefor containing a strong acid in an amount that is sufficient to neutralize the basic nitrogen atoms of the benzotriazole and a catalyst of the group consisting of platinum, palladium, and rhodium hydrogenation catalysts until the benzotriazole has absorbed an amount of hydrogen that is stoichiometrically equivalent to that required to form the corresponding tetrahydrobenzotriazole and subsequently recovering the resulting tetrahydrobenzotriazole.

6. A process as defined in claim 5 in which the strong acid is an acid of the group consisting of hydrochloric acid, sulfuric acid, and perchloric acid.

7. A process as defined in claim 5 in which the solvent is water, acetic acid, propionic acid, a lower aliphatic alcohol, a glycol ether, diethyl ether, tetrahydrofuran, or a mixture of these solvents.

8. The process of claim 5, wherein the triazole salt obtained is converted to the free base by reaction with alkali.

9. The process of claim 8, wherein the free base obtained is reacted with acid to obtain the acid addition salt.

10. The process of claim 8, wherein the free base is dissolved in methanol and the solution is reacted with an alkyl-, cycloalkyl- or arylalkyl halide to form the quaternary ammonium salt.

11. The process of claim 5, wherein the palladium-, rhodium- or platinum catalyst is employed on a carrier material.

12. The process of claim 11 wherein the carrier material is charcoal, barium sulfate, titanium dioxide, aluminum oxide or silicic acid.

13. The process of claim 5 wherein the hydrogenation is effected at a temperature between 20 and 120° C. and at a hydrogen pressure between about 1 and 120 kg./cm.$^2$.

References Cited

UNITED STATES PATENTS 3,197,475   7/1965   Carboni _____ 260—308 B

FOREIGN PATENTS 1,577,580   6/1969   France _____ 260—308 B

OTHER REFERENCES

Croce et al.: Gazz. Chim. Ital., vol. 97, pp. 589–596 (1967).

ALTON D. ROLLINS, Primary Examiner

U.S. Cl. X.R.

252—50, 51.5 R, 390, 392; 260—211.5 R, 247.2 R, 247.2 A, 247.5 E, 268 BC, 293.59, 308 D